March 2, 1937. R. A. SCHÜTTKUS 2,072,222

DEVICE FOR CONVEYING LOADS OVER INCLINED OR STEPPED SURFACES

Filed July 20, 1935 2 Sheets-Sheet 1

R. A. Schuttkus
Inventor

By: Glascock Downing & Seebold
Attys.

March 2, 1937.  R. A. SCHÜTTKUS  2,072,222
DEVICE FOR CONVEYING LOADS OVER INCLINED OR STEPPED SURFACES
Filed July 20, 1935  2 Sheets-Sheet 2
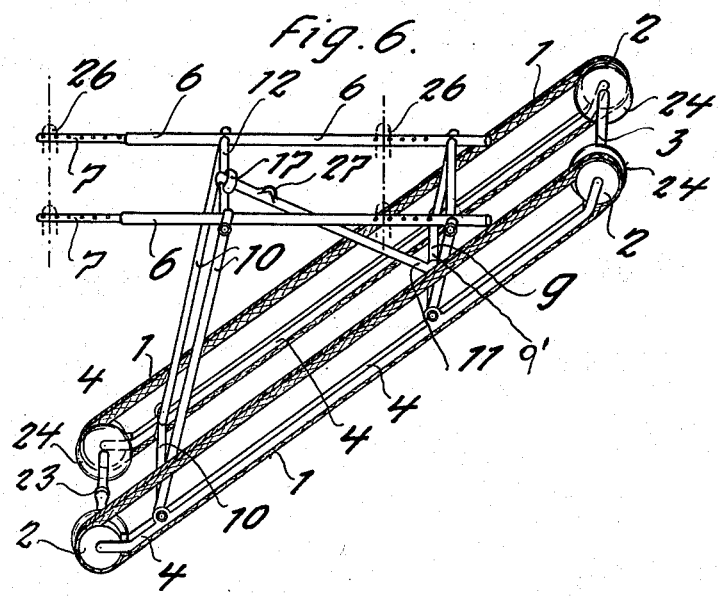
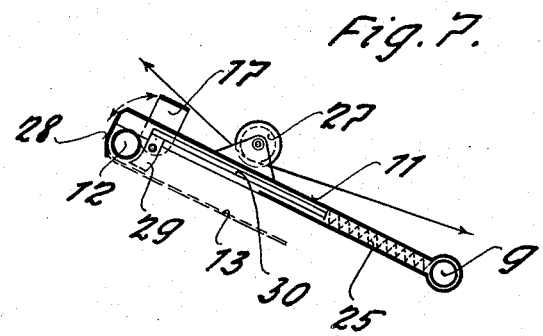
R. A. Schüttkus
INVENTOR
By Glascock Downing & Seebold
Attys Patented Mar. 2, 1937

2,072,222

UNITED STATES PATENT OFFICE 2,072,222

DEVICE FOR CONVEYING LOADS OVER INCLINED OR STEPPED SURFACES

Richard Arthur Schüttkus, Hamburg, Germar

Application July 20, 1935, Serial No. 32,452
In Germany April 27, 1935

4 Claims.  (Cl. 280—29)

Endless track devices for conveying loads, particularly perambulators over inclined surfaces, particularly stairs, are known which, without being rigidly attached to the load to be conveyed, hold it in a horizontal position while the conveying appliance is in an inclined position. In all these appliances the main problems are, firstly, to ensure the maximum amount of safety as regards the connection between the inclined transporting appliance and the load to be transported or conveyed and, secondly, to keep the load in the horizontal position.

The present invention solves this problem in a manner which will now be described with reference to the examples shown in the accompanying drawings. In these drawings:—

Fig. 1 is a plan view of the frame in one constructional embodiment, while

Fig. 3 is a plan view of another constructional form, while

Figure 5:
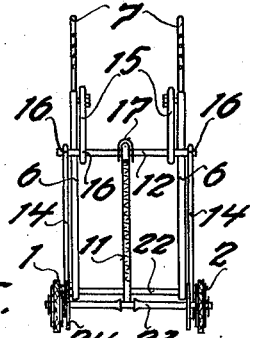

Fig. 5 the corresponding rear view.

Fig. 6 is a perspective view of the device, while Fig. 7 shows a detail (i. e. the locking link 11 between members 9 and 12).

Endless tracks 1 are guided, in the well known way, each over a pair of rollers 2, mounted in a frame 3. The longitudinal connecting bars 4, which carry the rollers, are U-shaped or otherwise profiled so as to provide openings or channels underneath, along which the endless tracks are guided, and a plurality of rollers, cylinders or balls 5, mounted in the said channels, afford support to the endless tracks while permitting them to slide easily.

The load (the underframe of a perambulator, for example) is connected to a frame-structure 6 furnished with suitable fastening devices 26 for fixing the frame of the perambulator. In order that this frame 6 may be able to accommodate different perambulators, having their axles or other points of attachment on their underframes at different distances apart, it may, for instance, include telescopically extensible tubular members 7 which, in their turn, carry fixing means on their ends, in the form of clips or the like. The attachment device 26 mounted on the other end 8 may likewise be adjustable longitudinally on the tube, for instance, by providing a number of different holes, so as to allow of suitable attachment when the wheels of a perambulator are of different diameters. The two frames 3 and 6 are are so connected to each other that, on the one hand, they can be easily folded together in flat form while, on the other hand, they are capable of forming an angle of about 30° with each other when in the operative position and must be able to be rigidly secured in this position. For this purpose the two frames 3 and 6 are connected to each other by two U-shaped rocking frames of which the front one 9 has both its limbs pivotally attached to fixed points on the frame 3, while the free ends of the limbs are pivotally attached to fixed points on the frame 6. The same holds good in the case of the frame 10. Thus, with the aid of the two connections 9 and 10, the whole frame 6 can execute a certain oscillating movement relatively to the frame 3 and, to secure it in the operative position the two associated fixed points of the U-shaped frame 9 are suitably connected by a spindle 9' at the centre of which a locking link 11 is pivotally mounted. A transverse connection, on which a hook-shaped recess in the locking link 11 can engage, may likewise be provided by a spindle 12 between the two fixed points of attachment of the frame 10 to the frame 6. This enables the structure to be locked in the erected or operative position. By means of a simple device adapted for pulling upwards, the link 11 can be brought out of engagement with the transverse connection 12 and the whole apparatus then folded up on to the perambulator. To ensure the different parts being properly guided when the apparatus is thus collapsed, the folding up movement can be improved to some extent by the aid of a parallel member 13, which in a way, forms an extension of the openmouthed hook portion of the lever 11.

The perspective view (Fig. 6) and the detail view (Fig. 7) illustrate the arrangement more clearly. In Fig. 7 the locking link 11 is shown in section. In its hollow interior is a slidable spring urged rod 30 having a hook-like lug 29. The upper or free extremity of the locking link 11 is terminated by the hooked extension 28 from which may extend the member 13, aforesaid (shown in dotted lines in Fig. 7). It will be obvious that with this arrangement the spindle 12 can slide between the member 13 and the link 11 the hook 28 acting as a stop in one direction and the hook-like lug 29 sliding to and fro excepting when, after the spring 25 has forced it into the end position, it is kept in that position by a rotatably mounted stirrup 17 (Figs. 4 to 7) being swung round behind the hook 28.

In the second form of construction the connection between the frame 3 and the frame 6 is effected exactly as in the first form, excepting that the connecting member 10 is constructed in a special manner as a toggle lever system, not for the purpose of collapsibility but solely for the purpose of acting as brake for the loaded frame in case of failure on the part of anyone looking after the arrangement. For the same purpose the open limbs of the shorter frame 9 are made to slide in the frame portion 6. In this example, as shown in side elevation in Fig. 4, the part 9 is slidably connected at its pivotal points of attachment to the frame 6. Either the sliding surface is provided in the frame 6 in the form of slots or the fixed point is located on the said frame and a slot, for it to slide in, is formed in the open end of the U-shaped member 9.

Figure 1:
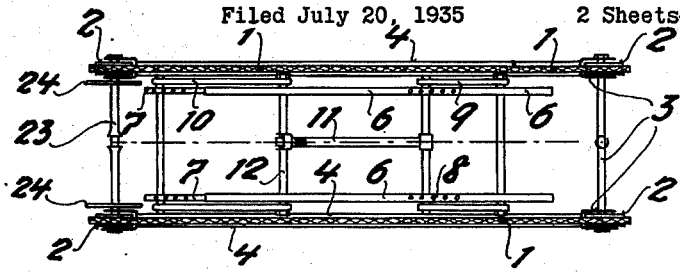
Figure 2:
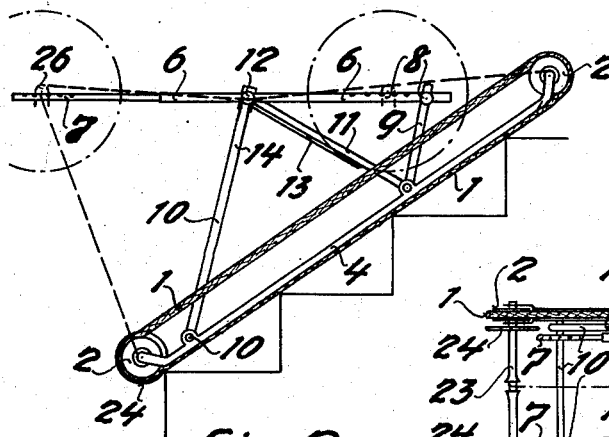
Fig. 2 shows the same device in side elevation. For the sake of clearness, the device is assumed, in both these figures to be set up in the operative position.
Figure 3:
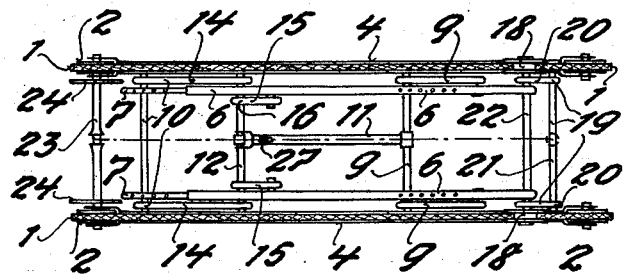
Figure 4:
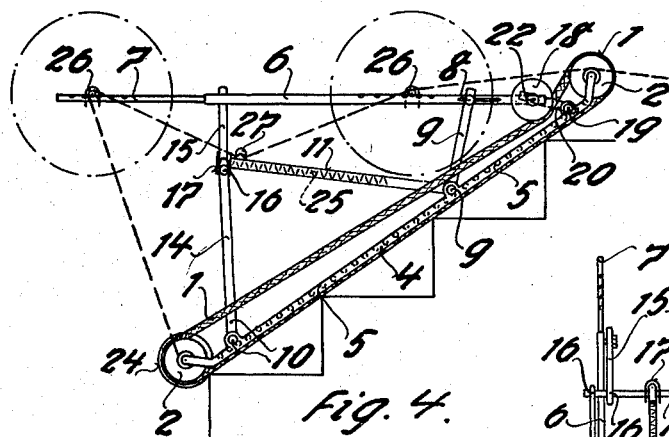
Fig. 4 shows the corresponding side elevation.

The rear part 10, which connects the frame member 3 to the frame 6, is constructed as a toggle system by subdividing the U-shaped limbs 14; they stop below the frame 6 and are pivotally connected thereto by intermediate levers 15. The lever portions 14 and 15 can, therefore, turn about their points of attachment to the frames 3 and 6 and can also turn relatively to each other on their common pivotal axis 12'. The toggle system may, as shown in Fig. 5, take the form of a frame, that is to say, the pivotal points 16, which connect the members 15 to the members 14, may lie on the axis 12' of a spindle connecting the free limbs 14, the middle of such spindle being arranged, at the same time, for engagement by the locking member 11. The locking lever may be provided with more than one hook, so as to be capable of adjusting the parts to different inclinations. It will also be obvious that it is possible to use a frame of locking levers instead of a single locking lever particularly in the case of large apparatus the width of which demands such a construction in the interests of security. The levers may be secured in their operative positions in various ways, for instance, as shown in Figs. 3 and 4, by means of a rotatably arranged sheath 17 which may take the simple form of a bent band provided with holes and embracing the locking lever 11 and may be mounted on the spindle in place of the hook attachment.

By the above described arrangement of the toggle lever system and of the frame 9, but particularly of the latter, the absence of the attendant who pulls the load forwards and thereby takes the load to some extent off the front of the frame, deprives the load of this support. The load therefore, presses on the forward portion 8, 9 of the frame and, acting through guide rollers 18, bears down on the endless track 1 thus putting a brake on the apparatus so that it cannot run down the inclined way. The toggle lever system nevertheless ensures that the load remains in a horizontal position. Especially when the inclination is slight, the toggle lever system may be dispensed with, the peculiar construction of the part 9 alone acting to afford a braking action. The construction of the parts 9 and 10 or 15 may be interchanged, if the load is to be pushed.

In order that, in the case of the second constructional form, the frame 6 shall not turn over backwards with the toggle lever system when the brake is applied, an additional guide for the fixing point of the rollers 18 is provided by a U-shaped frame 19, the limbs 20 of which are mounted pivotally on the spindle 22 of the rollers 18 and also pivoted on a spindle 21 which forms part of the frame 3 and stiffens this latter.

Consequently, the spindle member 22 which carries the rollers 18 can swing to and fro only as permitted by this guide member 20 and can bear upon the caterpillar track but cannot turn over backwards.

To bring the apparatus out of the operative position into the position of rest the link 11 is raised by a pull cord, for example. It then slides along on the spindle 12, until the frame has collapsed completely. In the part 11 is housed a compression spring 25 with abutment plate on its end said plate having a lug projecting from a slit in the said tube 11. When the frame is folded up the spindle 16 or 12 presses against this lug so that the plate and the spring are forced together into their position of rest. Conversely, when the frame is opened, this action automatically forces the whole frame into the operative position, inasmuch as the spring, by pressing in the opposite direction against the spindle 12, causes the entire system to open out. On the other hand, when the frame collapses, the spring prevents the load from flopping suddenly and jerkily into the normal position, a matter which is of particular importance in the case of perambulators. Instead of having a lug, guided in a slot, on the spring 25 in the link 11, this tubular link may be kept closed and provided with a portion adapted to slide telescopically in it this portion having the same effect as the lug. Instead of the spring arrangement a brake worked by oil under pressure or air, in the well known way, may obviously be employed.

The frame 3 has, at its rear side, a common spindle 23 for connecting the two guide rollers of the track 1. In the middle of this spindle may be fixed the release cord aforesaid. In the case of the perambulator, for instance, it may be passed over the perambulator axles and attached at the front to the spindle 21, say, by means of a leather clip or in any other suitable manner. When the cord is pulled the link 11 will be unhooked in some very simple way, as, for instance, by mounting a guide roller 27 on the top of the link 11 and drawing the cord under it. If now the cord has also been passed over the two axles of the perambulator or other load, located above the frame 6, this point, as will be seen from the side elevation in Fig. 4 will be at its lowest, that is to say, the guide roller 27 will be drawn upwards when the cord is pulled and, therefore, the link 11 will be released from its engagement with the spindle 12. By providing another point of attachment the cord can also be used to keep the frame together in the collapsed position.

At the rear part of the frame, more particularly on the spindle 23, there may conveniently be mounted, in addition to the guide rollers for the endless track 1, two rollers 24 which project beyond the path or contour of the said endless track and serve to take the load off the endless track when the said load is carried across stair landings. This greatly facilitates conveyance of the load which then rests on these two rollers only.

The structural parts may conveniently be tubular members so far as the construction of the levers is concerned. It is however, obvious that it is possible to use any desired kind of profile or contour for these links.

What I claim is:—

1. In a device for conveying loads over inclined surfaces, a frame, pairs of wheels rotatably mounted in said frame and endless tracks movably carried by said pairs of wheels, a second frame comprising telescopically extensible tubular members, a pair of longer oscillatory links and a pair of shorter oscillatory links, each of said pairs of oscillatory links pivotally attached to each of said frames and rods connecting the links of each pair at their lower and at their upper ends, a locking link pivoted on the rod connecting the lower end of the shorter links and having means to secure its free end to the rod connecting the upper ends of the longer oscillatory links.

2. The device as claimed in claim 1 in which the longer pair of oscillatory links are subdivided to form a toggle.

3. The device as claimed in claim 1 wherein the long links consist of toggles and a compression spring on the locking link for maintaining the toggle.

4. The device as claimed in claim 1 in which there are brake rollers supported at one end of the second named frame, and means on the first named frame for restricting the movement of said brake rollers.

RICHARD ARTHUR SCHÜTTKUS.